(12) United States Patent
Deng et al.

(10) Patent No.: US 12,517,181 B2
(45) Date of Patent: Jan. 6, 2026

(54) BATTERY LITHIUM PRECIPITATION STATE DETECTION METHOD AND SYSTEM, VEHICLE, DEVICE, AND STORAGE MEDIUM

(71) Applicant: BYD COMPANY LIMITED, Shenzhen (CN)

(72) Inventors: Linwang Deng, Shenzhen (CN); Tianyu Feng, Shenzhen (CN); Shiwei Shu, Shenzhen (CN); Sijia Liu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 384 days.

(21) Appl. No.: 18/188,788

(22) Filed: Mar. 23, 2023

(65) Prior Publication Data
US 2023/0221373 A1  Jul. 13, 2023

Related U.S. Application Data

(63) Continuation of application No. PCT/CN2021/120358, filed on Sep. 24, 2021.

(30) Foreign Application Priority Data

Sep. 27, 2020 (CN) .......................... 202011033185.8

(51) Int. Cl.
*G01R 31/3835* (2019.01)
*G01R 31/371* (2019.01)

(52) U.S. Cl.
CPC ....... *G01R 31/3835* (2019.01); *G01R 31/371* (2019.01)

(58) Field of Classification Search
CPC .......................... G01R 31/3835; G01R 31/371
See application file for complete search history.

(56) References Cited

U.S. PATENT DOCUMENTS

| 2017/0203660 A1* | 7/2017 | He .......................... B60L 58/14 |
| 2018/0316195 A1 | 11/2018 | Verbrugge et al. |

(Continued)

FOREIGN PATENT DOCUMENTS

| CN | 102736034 A | 10/2012 |
| CN | 108398649 A | 8/2018 |

(Continued)

OTHER PUBLICATIONS

The World Intellectual Property Organization (WIPO) International Search Report for PCT/CN2021/120358 Dec. 30, 2021 8 Pages.

(Continued)

*Primary Examiner* — Walter L Lindsay, Jr.
*Assistant Examiner* — Milton Gonzalez
(74) *Attorney, Agent, or Firm* — Wenye Tan

(57) ABSTRACT

A method for detecting a lithium plating state of a battery includes regularly collecting a voltage of a battery after the end of charging at a preset time interval after the battery is in an idle state, and associatively storing the collected voltage and a collection time as voltage data; constructing a time-differential voltage curve in a voltage-time coordinate system according to the voltage data; detecting whether a characteristic peak voltage exists in the time-differential voltage curve; and sending a warning message when detecting that the characteristic peak voltage exists in the time-differential voltage curve.

13 Claims, 3 Drawing Sheets

(56) References Cited

U.S. PATENT DOCUMENTS

| | | | |
|---|---|---|---|
| 2019/0031035 A1* | 1/2019 | Koch | ............... H01M 10/0525 |
| 2019/0379090 A1 | 12/2019 | Verbrugge et al. | |

FOREIGN PATENT DOCUMENTS

| | | |
|---|---|---|
| CN | 108519558 A | 9/2018 |
| CN | 108572325 A | 9/2018 |
| CN | 108872859 A | 11/2018 |
| CN | 109916987 A | 6/2019 |
| CN | 109932658 A | 6/2019 |
| CN | 111077456 A | 4/2020 |
| CN | 111175662 A | 5/2020 |
| CN | 111198328 A | 5/2020 |
| CN | 108572325 B | 3/2021 |
| CN | 109613436 B | 6/2021 |
| CN | 111175662 B | 7/2021 |
| JP | 2013089363 A | 5/2013 |
| JP | 2013110885 A | 6/2013 |
| WO | 2018209784 A1 | 11/2018 |

OTHER PUBLICATIONS

Bitzer Bernhard et al.: "A new method for detecting lithium plating by measuring the cell thickness", Journal of Power Sources, vol. 262, Sep. 1, 2014 (Sep. 1, 2014), pp. 297-302, XP093082956, Amsterdam, NL ISSN: 0378-7753, DOI: 10.1016/j.jpowsour.2014.03.142.

Koleti Upender Rao et al.: :A new on-line method for lithium plating detection in lithium-ion batteries, Journal of Power Sources, Elsevier, Amsterdam, NL, vol. 451, Jan. 30, 2020 (Jan. 30, 2020), XP086055283, ISSN: 0378-7753, DOI: 10.1016/J.JPOWSOUR.2020.227798.

* cited by examiner

BATTERY LITHIUM PRECIPITATION STATE DETECTION METHOD AND SYSTEM, VEHICLE, DEVICE, AND STORAGE MEDIUM

CROSS-REFERENCE TO RELATED APPLICATIONS

The present application is a continuation application of PCT application No. PCT/CN2021/120358 filed on Sep. 24, 2021, which claims priority to Chinese Patent Application No. 202011033185.8, filed on Sep. 27, 2020, and entitled "BATTERY LITHIUM PRECIPITATION STATE DETECTION METHOD AND SYSTEM, VEHICLE, DEVICE, AND STORAGE MEDIUM". The entire content of all of the above-referenced application is incorporated herein by reference.

FIELD

The present disclosure relates to the technical field of batteries, and more specifically, to a method and a system for detecting a lithium plating state of a battery, a vehicle, a device, and a storage medium.

BACKGROUND

As science and technology develop, new energy vehicles develop increasingly rapidly. Batteries are vital components of the new energy vehicles, and the safety of the batteries is of great significance. Lithium plating is considered as one of the most critical factors affecting the safety of the batteries, and is a main reason for performance degradation of lithium batteries. Lithium plating leads to an irreversible capacity loss and an internal short circuit of the battery, or even bring safety problems such as thermal runaway and combustion. Therefore, a lithium plating representation amount is an indispensable parameter for designing and evaluation of battery performance.

In the related art, the lithium plating representation amount is acquired in two ways. In a first way, the battery is disassembled, and then a plate status of the battery is observed, to determine the lithium plating representation amount of the battery. In a second way, the lithium plating representation amount is quantitatively analyzed through calculation according to voltage data of a constant current discharge curve or indirect calculation according to battery aging data. However, in the first way, the battery is destroyed and pollution may be caused, and observation and comparison are realized through the naked eyes. In the second way, the acquired lithium plating representation amount has low accuracy.

SUMMARY

The present disclosure provides a method and a system for detecting a lithium plating state of a battery, a vehicle, a device, and a storage medium, to resolve a problem that an acquired lithium plating representation amount has a low accuracy.

In a first aspect, the present disclosure provides a method for detecting a lithium plating state of a battery, including: regularly collecting a voltage of a battery after the end of charging at a preset time interval after the battery is in an idle state, and associatively storing the collected voltage and a collection time as voltage data; constructing a time-differential voltage curve in a voltage-time coordinate system according to the voltage data; detecting whether a characteristic peak voltage exists in the time-differential voltage curve; and sending a warning message when detecting that the characteristic peak voltage exists in the time-differential voltage curve.

In a second aspect, the present disclosure provides a computer device for detecting a lithium plating state of a battery. The computer device includes a memory for storing a computer program, and a processor for executing the computer program to perform: regularly collecting a voltage of a battery after the end of charging at a preset time interval after the battery is in an idle state, and associatively storing the collected voltage and a collection time as voltage data; constructing a time-differential voltage curve in a voltage-time coordinate system according to the voltage data; detecting whether a characteristic peak voltage exists in the time-differential voltage curve; and sending a warning message when detecting that the characteristic peak voltage exists in the time-differential voltage curve.

In a third aspect, the present disclosure provides a vehicle, including the above computer device for detecting a lithium plating state of a battery.

In a fourth aspect, the present disclosure provides a non-transitory computer-readable storage medium. The non-transitory computer-readable storage medium stores computer-executable instructions. When the computer-executable instructions are executed by a processor to perform a method for detecting a lithium plating state of a battery is implemented. The method includes regularly collecting a voltage of a battery after the end of charging at a preset time interval after the battery is in an idle state, and associatively storing the collected voltage and a collection time as voltage data; constructing a time-differential voltage curve in a voltage-time coordinate system according to the voltage data; detecting whether a characteristic peak voltage exists in the time-differential voltage curve; and sending a warning message when detecting that the characteristic peak voltage exists in the time-differential voltage curve.

According to the method and the system for detecting a lithium plating state of a battery, the vehicle, the device, and the storage medium provided in the present disclosure, the voltage of the battery after the end of charging is regularly collected at the preset time interval after the battery is in the idle state, and the collected voltage and the collection time are associatively stored as the voltage data; the time-differential voltage curve is constructed in the voltage-time coordinate system according to the voltage data; whether the characteristic peak voltage exists is detected in the time-differential voltage curve; it is prompted that the lithium plating occurs in the battery when the characteristic peak voltage is detected in the time-differential voltage curve; and it is prompted that the lithium plating does not occur in the battery when the characteristic peak voltage is not detected in the time-differential voltage curve.

In the present disclosure, whether the lithium plating occurs in the battery during the charging can be accurately and conveniently determined depending on whether the characteristic peak voltage appears in the time-differential voltage curve. Therefore, when the characteristic peak voltage appears in the time-differential voltage curve, it is prompted that the lithium plating occurs in the battery, so that the charging strategy adjusted according to the lithium plating and assessment of a battery aging status are more accurate and proper, thereby improving the safety of the battery.

BRIEF DESCRIPTION OF THE DRAWINGS

To describe the technical solutions in the embodiments of the present disclosure more clearly, the drawings for describing the embodiments of the present disclosure are briefly described below. Apparently, the drawings in the following description show merely some embodiments of the present disclosure, and a person of ordinary skill in the art may derive other drawings from these drawings without creative efforts.

DETAILED DESCRIPTION

The technical solutions in the embodiments of the present disclosure are described below with reference to the drawings. Apparently, the described embodiments are merely some of the embodiments of the present disclosure rather than all of the embodiments. Other embodiments obtained by a person of ordinary skill in the art based on the embodiments of the present disclosure without creative efforts shall fall within the protection scope of the present disclosure.

Figure 1:
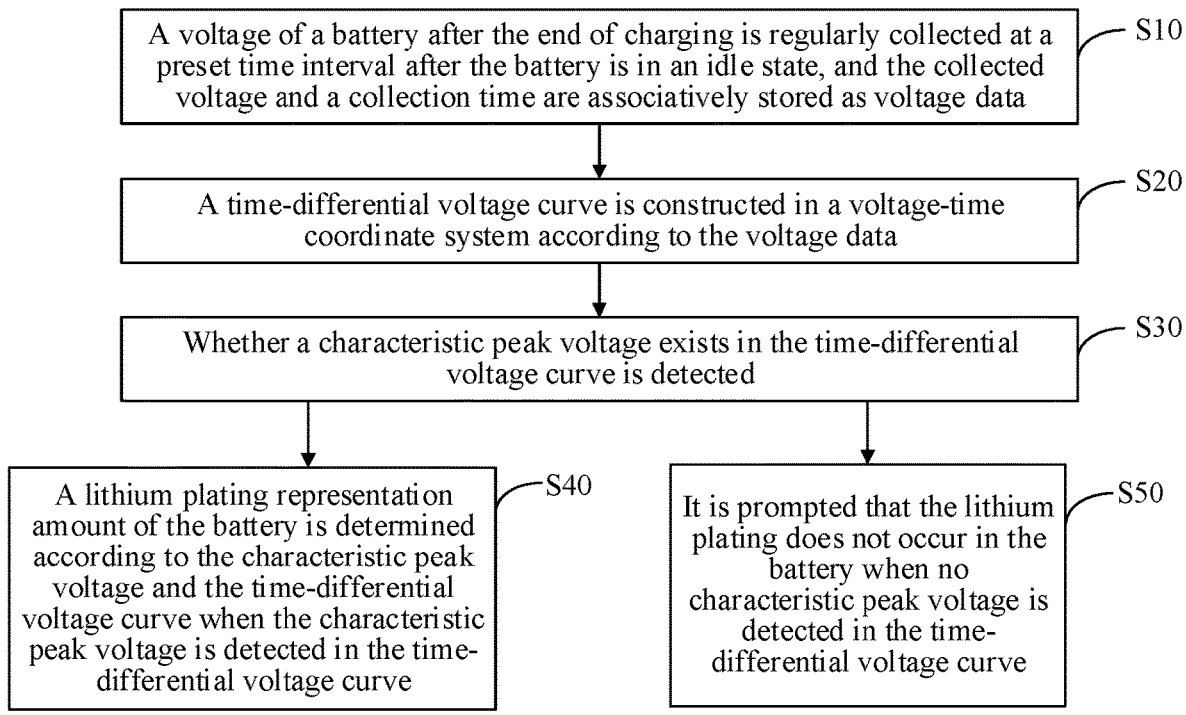
FIG. 1 is a flowchart of a method for detecting a lithium plating state of a battery according to an embodiment of the present disclosure.

In an embodiment, as shown in FIG. 1, a method for detecting a lithium plating state of a battery is provided, including the following steps:

S10: A voltage of a battery after the end of charging is regularly collected at a preset time interval after the battery is in an idle state, and the collected voltage and a collection time are associatively stored as voltage data.

Charging ending indicates that current charging has ended. For example, when a current SOC value of the battery reaches a preset charging requirement, the charging needs to be ended. The battery in this step is a battery waits for lithium plating state detection. Optionally, the battery may be a power battery or a 3C battery. Lithium plating of the battery during the charging means that a part of lithium metal is deposited on a negative electrode of the battery during the charging of the battery. The preset time interval may be determined according to an actual detection demand (such as a type of battery to be detected). For example, the preset time interval may be 5 s or 10 s. The collection time is a time point corresponding to the voltage of the battery collected according to the preset time interval. The voltage data includes each voltage and a corresponding collection time.

Specifically, after the charging of the battery ends, the battery is caused to be in the idle state. The voltage of the battery is regularly collected at the preset time interval after the battery is in the idle state, and the collected voltage and the collection time are associatively stored as the voltage data.

S20: A time-differential voltage curve is constructed in a voltage-time coordinate system according to the voltage data.

Figure 2:
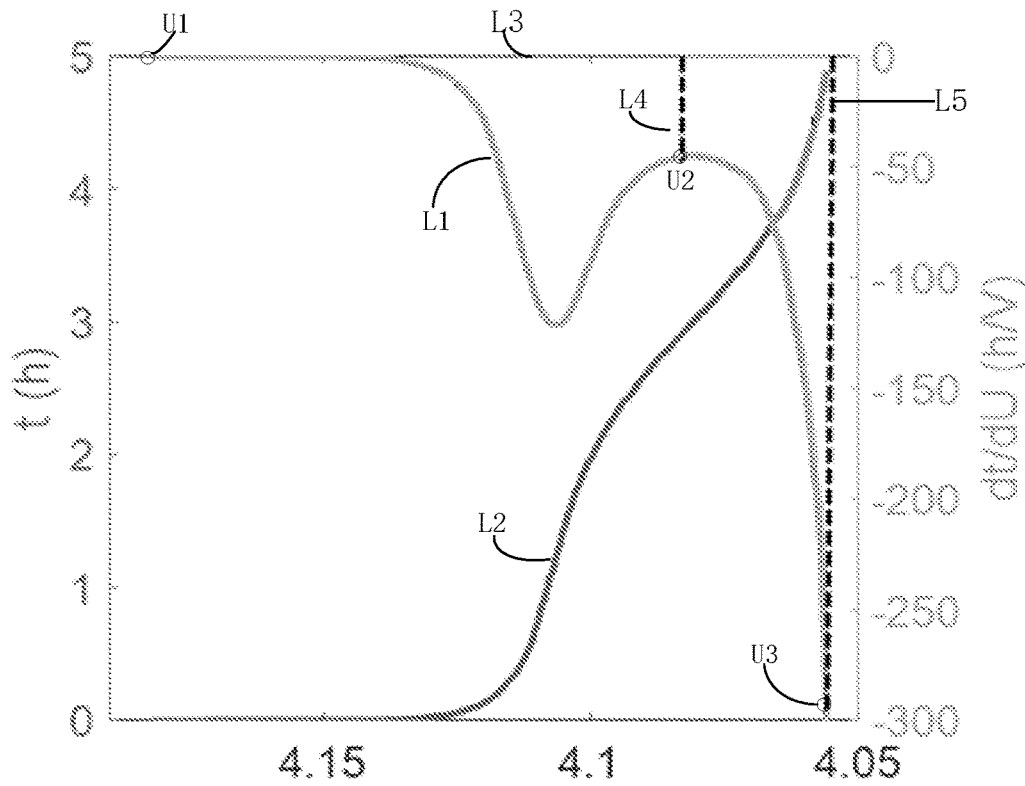
FIG. 2 is a schematic diagram of a voltage-time coordinate system in the method for detecting a lithium plating state of a battery according to an embodiment of the present disclosure.

The time-differential voltage curve represents a curve of variation of a first derivative relationship of the battery with the voltage. The first derivative relationship is calculated according to the collection time and the voltage. The voltage-time coordinate system is shown in FIG. 2. A horizontal axis of the coordinate system represents the collected voltage of the battery, and a vertical axis represents the time corresponding to the collected voltage of the battery. L1 represents the time-differential voltage curve. Specifically, after the voltage of the battery is regularly collected according to the preset time interval and the collected voltage and the collection time of the voltage are associatively stored as the voltage data, the first derivative relationship corresponding to the voltage data is obtained according to the voltage data by using a time-differential voltage, and then the time-differential voltage curve is determined.

Optionally, constructing the time-differential voltage curve in the voltage-time coordinate system according to the voltage data in step S20 includes: generating the time-differential voltage curve according to the voltage data and the preset first derivative relationship. The preset first derivative relationship is calculated according to each set of collected voltage of the battery and collection time, and the preset first derivative relationship is dt/dU.

Specifically, after the voltage of the battery is regularly collected according to the preset time interval and the collected voltage and the collection time of the voltage are associatively stored as the voltage data, a preset first derivative relationship is obtained according to each set of voltage and corresponding collection time in the voltage data. Since each collected voltage has a corresponding first derivative relationship value, the time-differential voltage curve can be determined.

S30: Whether a characteristic peak voltage exists in the time-differential voltage curve is detected.

S40: It is prompted that lithium plating occurs in the battery when the characteristic peak voltage is detected in the time-differential voltage curve.

S50: It is prompted that the lithium plating does not occur in the battery when no characteristic peak voltage is detected in the time-differential voltage curve.

Whether the characteristic peak voltage exists in the time-differential voltage curve may be detected through a peak identification algorithm. The peak identification algorithm is used for finding a characteristic peak voltage corresponding to a characteristic peak when the characteristic peak appears in the time-differential voltage curve. The mathematical meaning of characteristic peak voltage is a maximum value of a time required for voltage change in the time-differential voltage curve. In the physical sense, the characteristic peak voltage is used for characterizing the occurrence of lithium plating in the battery during the charging, that is, a chemical reaction that occurs when "active lithium" ("active lithium" is lithium metal in electrical contact with graphite) generated on a surface of a negative electrode of the battery enters graphite of the negative electrode of the battery in the idle state after the charging.

The preset stability standard means that a curve value of the time-differential voltage curve approaches a stable state in a range of −100 to −∞. In this embodiment, when a variation of the time-differential voltage curve with the voltage is very small within a long time (the curve approaches a straight line, and the curve value in the time-differential voltage curve approaches a stable state), a corresponding voltage value in the time-differential voltage curve at the beginning of the state is recorded as the stable voltage.

Specifically, after the time-differential voltage curve is determined according to the voltage data, the characteristic peak voltage in the time-differential voltage curve is identified through the peak identification algorithm to represent the occurrence of lithium plating in the battery during the charging, that is, to determine that the battery has a lithium plating state during the charging. In this case, after the characteristic peak voltage is determined, a lithium plating representation amount of the battery needs to be determined according to the characteristic peak voltage and the time-differential voltage curve. In this embodiment, a search region may be set in the above voltage-time coordinate system (for example, the search region may be defined according to time) for the peak identification algorithm. If a maximum value is found in the region (that is, as shown in FIG. 2, a point where the time-differential voltage curve L1 rises first and then falls exists, that is, a characteristic peak occurs), the point corresponding to the maximum value is determined as the characteristic peak point.

During the charging of the battery, if partial lithium metal is deposited on the negative electrode of the battery, since the graphite of the battery is affected by an externally applied electric field, an internal electric field distribution inside the graphite is at a high potential (+) near the diaphragm and at a low potential (−) near the copper foil. An external lithium ion concentration of the graphite presents a gradient distribution from the diaphragm to the copper foil. For a single graphite particle, the external lithium ion concentration of the graphite is higher than an internal lithium ion concentration. In the process in which the battery enters the idle state after the charging ends, the partial lithium metal deposited from the battery during the charging is oxidized into lithium ions on the outside of the particle. Since the external lithium ion concentration of the graphite at the diaphragm is much higher than that near the copper foil, the lithium ions migrate and diffuse from the diaphragm to the copper foil under the effect of the electric field and a concentration difference, and electrons migrate from the inside to the copper foil. The lithium ion concentration from the diaphragm to the copper foil is gradually equilibrated, and the deposited lithium metal is slowly and completely inserted into the graphite. Therefore, in this embodiment, when the characteristic peak voltage appears in the time-differential voltage curve, it indicates that most of the "active lithium" has been completely intercalated in the graphite of the negative electrode of the battery, that is, when the characteristic peak voltage appears in the time-differential voltage curve, it not only indicates that the lithium plating occurs in the battery during the charging, but also indicates that the lithium plating reaction of the battery is substantially completed when the characteristic peak voltage appears (since the "active lithium" enters the graphite layer and then generates a voltage platform when the battery is in the idle state after the lithium plating reaction of the battery and a time required for a unit voltage change becomes longer after the voltage platform is generated, a peak, that is, the characteristic peak voltage, appears on the time-differential voltage curve, and at this time, it is considered that the lithium plating reaction of the battery is substantially completed).

In this embodiment, whether the lithium plating occurs in the battery during the charging can be accurately and conveniently determined depending on whether the characteristic peak voltage appears in the time-differential voltage curve. Therefore, when the characteristic peak voltage appears in the time-differential voltage curve, it is prompted that the lithium plating occurs in the battery, so that the charging strategy adjusted according to the lithium plating and assessment of a battery aging status are more accurate and proper, thus improving the safety of the battery. The present disclosure improves the accuracy and convenience of lithium plating detection of batteries.

In another embodiment, after the time-differential voltage curve is determined according to the voltage data, if the characteristic peak voltage in the time-differential voltage curve is not identified through the peak identification algorithm, it is prompted that the lithium plating does not occur in the battery during the last charging. Specifically, since the characteristic peak voltage in the present disclosure is used for characterizing the occurrence of lithium plating in the battery during the charging in the physical sense, after the time-differential voltage curve is determined according to the voltage data, if the characteristic peak voltage in the time-differential voltage curve is not identified through the peak identification algorithm, it represents that the lithium plating does not occur in the battery during the charging.

Figure 3:
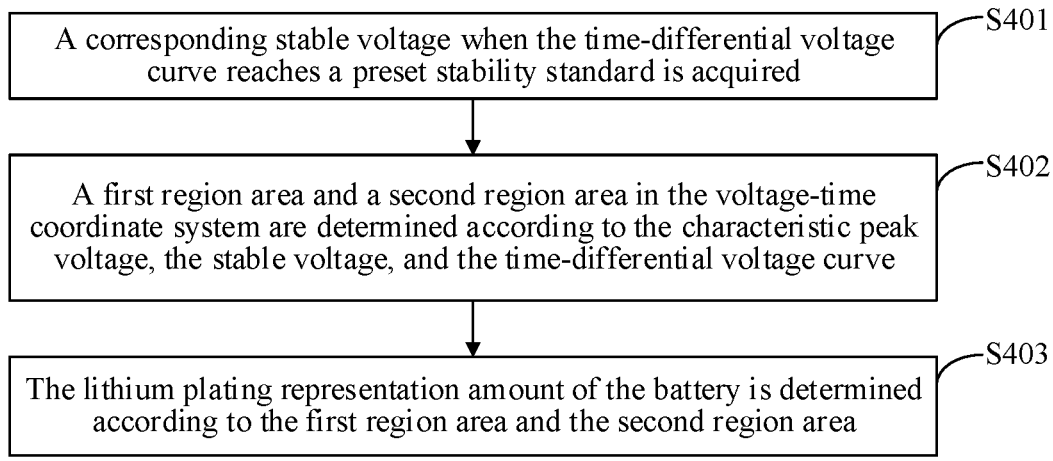
FIG. 3 is a flowchart of step S40 in the method for detecting a lithium plating state of a battery according to an embodiment of the present disclosure.

In an embodiment, as shown in FIG. 3, after it is prompted that the lithium plating occurs in the battery when the characteristic peak voltage is detected in the time-differential voltage curve in step S40, the method further includes the following steps:

S401: A corresponding stable voltage when the time-differential voltage curve reaches a preset stability standard is acquired.

S402: A first region area and a second region area in the voltage-time coordinate system are determined according to the characteristic peak voltage, the stable voltage, and the time-differential voltage curve.

Specifically, after the characteristic peak voltage in the time-differential voltage curve is identified through the preset peak identification algorithm and the corresponding stable voltage when the time-differential voltage curve reaches the preset stability standard after the characteristic peak voltage appears, the first region area corresponding to a region defined by the time-differential voltage curve and a horizontal axis corresponding to a start point from the start point to an end point corresponding to the characteristic peak voltage, and the second region area corresponding to a region defined by the time-differential voltage curve and a horizontal axis corresponding to a start point corresponding to the characteristic peak voltage from the start point to an end point corresponding to the stable voltage.

Figure 4:
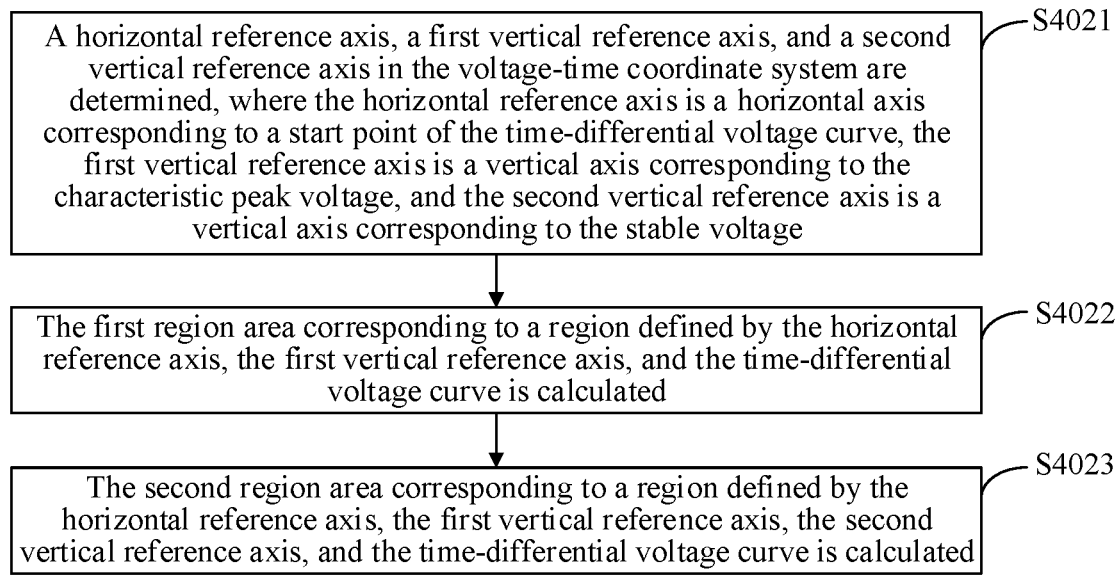
FIG. 4 is a flowchart of step S402 in the method for detecting a lithium plating state of a battery according to an embodiment of the present disclosure.

As shown in FIG. 4, the step S402 of determining the first region area and the second region area in the voltage-time coordinate system according to the characteristic peak voltage, the stable voltage, and the time-differential voltage curve includes the following steps:

S4021: A horizontal reference axis, a first vertical reference axis, and a second vertical reference axis in the voltage-time coordinate system are determined, where the horizontal reference axis is a horizontal axis corresponding to a start point of the time-differential voltage curve, the first vertical reference axis is a vertical axis corresponding to the characteristic peak voltage, and the second vertical reference axis is a vertical axis corresponding to the stable voltage.

S4022: The first region area corresponding to a region defined by the horizontal reference axis, the first vertical reference axis, and the time-differential voltage curve is calculated.

S4023: The second region area corresponding to a region defined by the horizontal reference axis, the first vertical reference axis, the second vertical reference axis, and the time-differential voltage curve is calculated.

A start voltage is a voltage value at the end of the charging of the battery. The start point of the time-differential voltage curve is the start voltage at the end of the charging of the battery. In the voltage-time coordinate system shown in FIG. 2, U1 is the start point in the time-differential voltage curve (the start point corresponds to the start voltage at the end of the charging of the battery), U2 is the point in the time-differential voltage curve corresponding to the characteristic peak voltage, U3 is the point in the time-differential voltage curve corresponding to the stable voltage, L3 is the horizontal reference axis, L4 is the first vertical reference axis, and L5 is the second vertical reference axis.

Specifically, after the characteristic peak voltage in the time-differential voltage curve is identified through the preset peak identification algorithm and the corresponding stable voltage when the time-differential voltage curve reaches the preset stability standard is recorded after the characteristic peak voltage is determined, the charging voltage at the end of the charging of the battery is acquired. The charging voltage is the start point in the time-differential voltage curve. The horizontal axis corresponding to the start point is used as the horizontal reference axis, and a vertical axis in the time-differential voltage curve corresponding to the characteristic peak voltage is used as the first vertical reference axis. The first vertical reference axis is perpendicular to the horizontal reference axis. Then the first region area corresponding to the region defined by the horizontal reference axis, the first vertical reference axis, and the time-differential voltage curve is calculated. The first region area represents a duration required for the "active lithium" deposited from the battery during the charging to be intercalated into the graphite from the outside of the graphite of the battery, that is, a lithium plating duration in step S4031.

Specifically, after the characteristic peak voltage in the time-differential voltage curve is identified through the preset peak identification algorithm and the corresponding stable voltage when the time-differential voltage curve reaches the preset stability standard after the characteristic peak voltage appears, the charging voltage at the end of the charging of the battery is acquired. The charging voltage is the start point in the time-differential voltage curve. The horizontal axis corresponding to the start point is used as the horizontal reference axis, the vertical axis in the time-differential voltage curve corresponding to the characteristic peak voltage is used as the first vertical reference axis, and a vertical axis in the time-differential voltage curve corresponding to the stable voltage is used as a second vertical reference axis. Since the first vertical reference axis is parallel to the second vertical reference axis and the first vertical reference axis and the second vertical reference axis are both perpendicular to the horizontal reference axis, the second region area corresponding to the region defined by the horizontal reference axis, the first vertical reference axis, the second vertical reference axis, and the time-differential voltage curve. A reciprocal of the second region area may be used for representing a rate of lithium intercalation in the graphite of the battery (that is, the lithium plating rate in step S4031).

S403: A lithium plating representation amount of the battery is determined according to the first region area and the second region area.

The lithium plating representation amount represents a degree of the lithium plating of the battery during the charging. Specifically, after the first region area is obtained according to the characteristic peak voltage and the time-differential voltage curve and the second region area is obtained according to the characteristic peak voltage, the stable voltage, and the time-differential voltage curve, the lithium plating representation amount of the battery is determined according to the first region area and the second region area, and then the severity of the current lithium plating of the battery during the charging may be determined through a lithium plating standard of the battery in the factory specification.

As an example, if the lithium plating representation amount exceeds the corresponding lithium plating standard of the battery, a charging current for charging the battery next time needs to be reduced through a preset current reduction strategy (generally, the charging current for the battery is stored in a battery charging strategy table, and therefore reducing the charging current means reducing a current charging current in the battery charging strategy table). For example, the lithium plating representation amount after the charging of the battery is completed exceeds the lithium plating standard, and a reduction ratio is preset to 1% of the current charging current. If the charging current in the battery charging strategy table is 1 A, the charging current may be reduced by 1%, that is, the charging current is reduced to 0.99 A. Therefore, the battery may be charged with the reduced charging current during the next charging of the battery, so that the lithium plating representation amount of the battery can be reduced, thereby realizing protection for the battery. The preset current reduction strategy means determining the reduction ratio of the charging current that needs to be reduced according to the lithium plating representation amount after the charging of the battery is completed and the lithium plating standard corresponding to the battery, and then reducing and updating the charging current in the battery charging strategy table according to the reduction ratio.

As another example, if the lithium plating representation amount exceeds the lithium plating standard corresponding to the battery significantly (for example, the excess amount is greater than or equal to a preset percentage of the lithium plating standard, and exemplarily, the preset percentage may be 40%, however, the preset percentage may alternatively be set to other percentages other than 40% as required; and if the excess amount is less than the preset percentage, the current charging current in the battery charging strategy table may be reduced according to the above preset current reduction strategy), it represents that the battery needs to be returned to the factory for maintenance to avoid safety accidents caused by the excessive lithium plating representation amount of the battery.

In this embodiment, the time-differential voltage curve is determined according to the voltage collected according to the preset interval and the collection time after the battery after the end of charging is in the idle state. That is to say, whether the lithium plating occurs in the battery is determined without relying on a discharging mode of the battery, and the voltage data acquired in the idle state after the end of charging is more accurate (in this solution, the detection is performed only after the charging of the battery ends and the battery is in the idle state, and therefore, the discharging mode of the battery is not required, and a voltage change in the idle state is controllable, so that the acquired time-differential voltage curve has a high accuracy). Moreover, it can be accurately and conveniently determined that the lithium plating occurs in the battery during the charging when it is determined that the characteristic peak voltage appears in the time-differential voltage curve. Then the stable voltage in the time-differential voltage curve is determined to determine the first region area in the voltage-time coordinate system according to the start voltage at the end of the charging of the battery, the characteristic peak voltage, and the time-differential voltage curve, the second region area in the voltage-time coordinate system is determined according to the characteristic peak voltage, the stable voltage, and the time-differential voltage curve, and the lithium plating representation amount of the battery is determined according to the first region area and the second region area. Therefore, the charging strategy adjusted according to the lithium plating representation amount and assessment of a battery aging status are more accurate and proper, thereby improving the safety of the battery.

Figure 5:
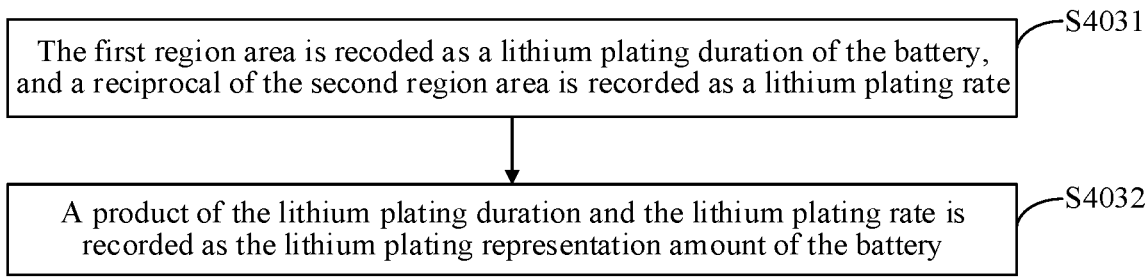
FIG. 5 is a flowchart of step S403 in the method for detecting a lithium plating state of a battery according to an embodiment of the present disclosure.

In an embodiment, as shown in FIG. 5, step S403 of determining the lithium plating representation amount of the battery according to the first region area and the second region area includes the following steps:

S4031: The first region area is recoded as a lithium plating duration of the battery, and a reciprocal of the second region area is recorded as a lithium plating rate.

A time point at which the characteristic peak voltage appears in the time-differential voltage curve is a time point at which the active lithium is completely intercalated in the graphite. That is to say, a physical meaning of the first region area is the duration required for the "active lithium" deposited from the battery during the charging to be intercalated into the graphite from the outside of the graphite, and the second region area corresponding to the characteristic peak voltage to the stable voltage indicates that the lithium ion concentration is substantially equilibrated from the diaphragm to the copper foil. Therefore, the lithium ions tend to diffuse from the outside of the graphite particle into the particle, thereby realizing uniform distribution of the lithium ions in the whole graphite particle.

Specifically, since the physical meaning of the first region area is the duration required for the "active lithium" deposited from the battery during the charging to be intercalated into the graphite from the outside of the graphite, a total lithium plating representation amount of the battery represented by only the first region area is inaccurate. This is because the duration is related to the lithium plating representation amount and the rate of lithium intercalation in the graphite, and the rate of lithium intercalation in the graphite is related to a temperature. In this case, the duration can be used to represent the lithium plating representation amount only at the same temperature.

Therefore, in the present disclosure, the reciprocal of the second region area is used to represent the lithium plating rate of the battery. However, since some "active lithium" that has entered the negative electrode is in an equilibrated state during intercalation of other "active lithium" in the negative electrode within the collection time of the first region area, a time of equilibrium of some "active lithium" in the negative electrode coincides with the collection time of the first region area. However, before the characteristic peak voltage is reached, "active lithium" enters the negative electrode. After the characteristic peak voltage is reached, the concentration difference is a rate of lithium intercalation in the graphite (that is, the lithium plating rate) in the negative electrode represented by a maximum reciprocal of a time from complete intercalation of all the "active lithium" in the negative electrode to final equilibrium reached by the graphite particle in the negative electrode (that is, the second region area).

S4032: A product of the lithium plating duration and the lithium plating rate is recorded as the lithium plating representation amount of the battery.

Specifically, after the lithium plating duration of the battery is determined according to the first region area and the lithium plating rate of the battery is determined according to the second region area, the lithium plating representation amount of the battery is determined according to the product of the lithium plating duration and the lithium plating rate.

According to the above description, the first region area may be recoded as the lithium plating duration of the battery, and the reciprocal of the second region area may be recoded as the lithium plating rate of the battery, so that the product of the reciprocal of the second region area and the first region area may be recorded as the lithium plating representation amount of the battery. That is to say, the product of the lithium plating duration and the lithium plating rate is recorded as the lithium plating representation amount of the battery.

The order of the sequence numbers of the steps in the above embodiment does not mean an execution sequence. The execution sequence of the processes needs to be determined according to the functions and the internal logic, and should not constitute any limitation on the implementation process of the embodiments of the present disclosure.

Figure 6:
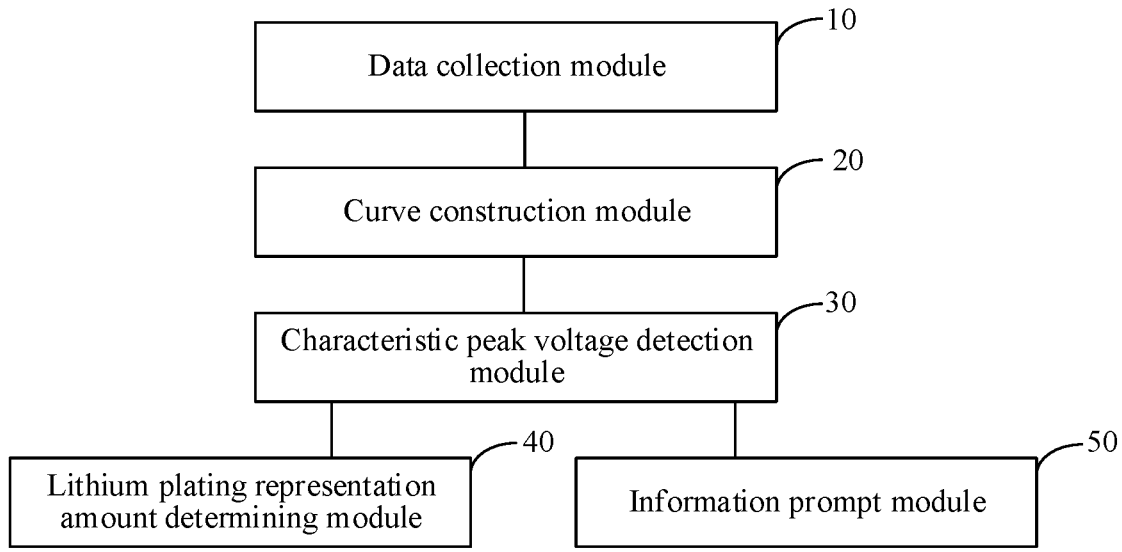
FIG. 6 is a principle block diagram of the method for detecting a lithium plating state of a battery according to an embodiment of the present disclosure.

In an embodiment, as shown in FIG. 6, a system for detecting a lithium plating state of a battery is provided, including:
  a data collection module 10, configured to regularly collect a voltage of a battery after the end of charging at a preset time interval after the battery is in an idle state, and associatively store the collected voltage and a collection time as voltage data;
  a curve construction module 20, configured to construct a time-differential voltage curve in a voltage-time coordinate system according to the voltage data;
  a characteristic peak voltage detection module 30, configured to detect whether a characteristic peak voltage exists in the time-differential voltage curve;
  a lithium plating representation amount determining module 40, configured to prompt that lithium plating occurs in the battery when detecting the characteristic peak voltage in the time-differential voltage curve; and
  an information prompt module 50, configured to prompt that the lithium plating does not occur in the battery when detecting no characteristic peak voltage in the time-differential voltage curve.

In an embodiment, the lithium plating representation amount determining module 40 includes the following units:
  a stable voltage acquisition sub-module, configured to acquire a corresponding stable voltage when the time-differential voltage curve reaches a preset stability standard;
  a region area determining sub-module, configured to determine a first region area and a second region area in the voltage-time coordinate system according to the characteristic peak voltage, the stable voltage, and the time-differential voltage curve; and
  a lithium plating representation amount determining sub-module, configured to determine a lithium plating representation amount of the battery according to the first region area and the second region area.

In an embodiment, the region area determining sub-module includes:
- a coordinate axis determining unit, configured to determine a horizontal reference axis, a first vertical reference axis, and a second vertical reference axis in the voltage-time coordinate system, where the horizontal reference axis is a horizontal axis corresponding to a start point of the time-differential voltage curve, the first vertical reference axis is a vertical axis corresponding to the characteristic peak voltage, and the second vertical reference axis is a vertical axis corresponding to the stable voltage;
- a first region area calculation unit, configured to calculate the first region area corresponding to a region defined by the horizontal reference axis, the first vertical reference axis, and the time-differential voltage curve; and
- a second region area calculation unit, configured to calculate the second region area corresponding to a region defined by the horizontal reference axis, the first vertical reference axis, the second vertical reference axis, and the time-differential voltage curve.

In an embodiment, the lithium plating representation amount determining sub-module includes:
- a lithium plating data recording unit, configured to: record the first region area as a lithium plating duration of the battery; and record a reciprocal of the second region area as a lithium plating rate; and
- a lithium plating representation amount determining unit, configured to record a product of the lithium plating duration and the lithium plating rate as the lithium plating representation amount of the battery.

In an embodiment, the system for detecting a lithium plating state of a battery further includes:
- a lithium plating standard acquisition sub-module, configured to: acquire a preset lithium plating standard of the battery, and determine whether the lithium plating representation amount of the battery is greater than the preset lithium plating standard; and
- a charging current reduction sub-module, configured to reduce a charging current of the battery by using a preset current reduction strategy when the lithium plating representation amount is greater than the preset lithium plating standard.

In an embodiment, a vehicle is provided, including the system for detecting a lithium plating state of a battery in the above embodiment.

Figure 7:
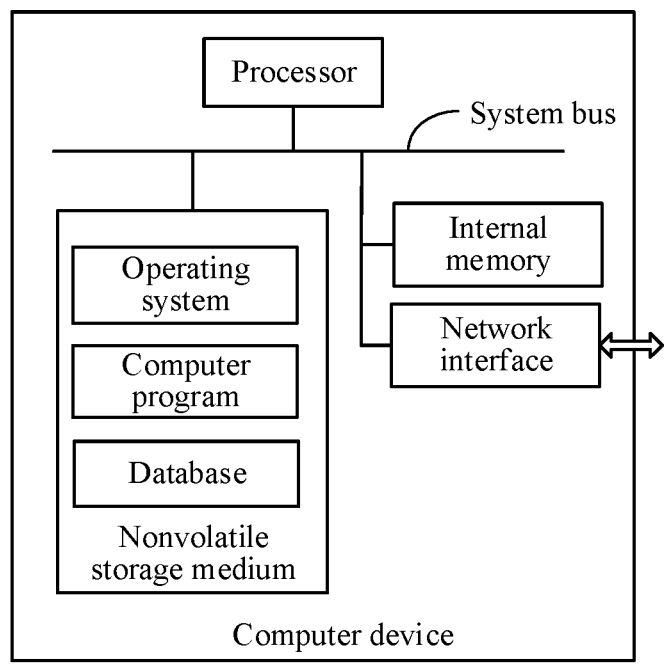
FIG. 7 is a schematic diagram of a computer device according to an embodiment of the present disclosure.

In an embodiment, a computer device is provided. The computer device may be a server. An internal structure diagram of the server may be shown in FIG. 7. The computer device includes a processor, a memory, a network interface, and a database connected through a system bus. The processor of the computer device is configured to provide computing and control capabilities. The memory of the computer device includes a non-volatile storage medium and an internal memory. The non-volatile storage medium stores an operating system, a computer program, and the database. The internal memory provides an environment for the running of the operating system and the computer program in the non-volatile storage medium. The database of the computer device is configured to store the data used in the method for detecting a lithium plating state of a battery in the above embodiment. The network interface of the computer device is configured to connect and communicate with an external terminal through a network. The computer program, when executed by the processor, implements the method for detecting a lithium plating state of a battery.

In an embodiment, a computer device is provided, including a memory, a processor, and a computer program stored in the memory and executable in the processor. The processor implements the method for detecting a lithium plating state of a battery in the above embodiment when executing the computer program.

In an embodiment, a computer-readable storage medium is provided, storing a computer program. The computer program, when executed by a processor, implements the method for detecting a lithium plating state of a battery in the above embodiment.

A person of ordinary skill in the art may understand that all or some of processes of the method in the above embodiment may be implemented by instructing relevant hardware through a computer program. The computer program may be stored in a non-volatile computer-readable storage medium. The program, when executed, may include the processes of the embodiments of the methods described above. Any reference to the memory, the storage, the database, or other media used in the embodiments provided in the present disclosure may include a non-volatile memory or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of description rather than limitation, the RAM may be obtained in multiple forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a Rambus direct RAM (RDRAM), a direct Rambus dynamic RAM (DRDRAM), and a Rambus dynamic RAM (RDRAM).

A person skilled in the art may clearly understand that, for convenience and brevity of description, only division of the above functional units and modules is illustrated. In actual application, the above functions may be assigned to different functional units and modules for completion as required, that is, an internal structure of the apparatus is divided into different functional units or modules to complete all or some of functions described above.

The above embodiments are merely used for describing the technical solutions of the present disclosure and are not for limiting the present disclosure. Although the present disclosure is described in detail with reference to the above embodiments, it is to be understood by a person skilled in the art that they may still make modifications to the technical solutions described in the above embodiments or make equivalent replacements to some technical features therein. The modifications or the replacements do not cause the essence of the corresponding technical solutions to depart from the spirit and the scope of the technical solutions of the embodiments of the present disclosure, and all fall within the protection scope of the present disclosure.

What is claimed is:

1. A method for detecting a lithium plating state of a battery, comprising:
   regularly collecting a voltage of a battery after the end of charging at a preset time interval after the battery is in an idle state, and associatively storing the collected voltage and a collection time as voltage data;
   constructing a time-differential voltage curve in a voltage-time coordinate system according to the voltage data;
   detecting whether a characteristic peak voltage exists in the time-differential voltage curve; and sending a warning message when detecting that the characteristic peak voltage exists in the time-differential voltage curve,
wherein the method further includes:
acquiring a corresponding stable voltage when the time-differential voltage curve reaches a preset stability standard;
determining a first region area and a second region area in the voltage-time coordinate system according to the characteristic peak voltage, the stable voltage, and the time-differential voltage curve; and
determining a lithium plating representation amount of the battery according to the first region area and the second region area.

2. The method according to claim 1, wherein the determining a first region area and a second region area in the voltage-time coordinate system according to the characteristic peak voltage, the stable voltage, and the time-differential voltage curve comprises:
determining a horizontal reference axis, a first vertical reference axis, and a second vertical reference axis in the voltage-time coordinate system, wherein the horizontal reference axis is a horizontal axis corresponding to a start point of the time-differential voltage curve, the first vertical reference axis is a vertical axis corresponding to the characteristic peak voltage, and the second vertical reference axis is a vertical axis corresponding to the stable voltage;
calculating the first region area corresponding to a region defined by the horizontal reference axis, the first vertical reference axis, and the time-differential voltage curve; and
calculating the second region area corresponding to a region defined by the horizontal reference axis, the first vertical reference axis, the second vertical reference axis, and the time-differential voltage curve.

3. The method according to claim 1, wherein the determining a lithium plating representation amount of the battery according to the first region area and the second region area comprises:
recording the first region area as a lithium plating duration of the battery; recording a reciprocal of the second region area as a lithium plating rate; and
recording a product of the lithium plating duration and the lithium plating rate as the lithium plating representation amount of the battery.

4. The method according to claim 1 wherein after the determining a lithium plating representation amount of the battery according to the first region area and the second region area, the method further comprises:
acquiring a preset lithium plating standard of the battery; and
reducing a charging current of the battery by using a preset current reduction strategy when the lithium plating representation amount is greater than the preset lithium plating standard.

5. A computer device for detecting a lithium plating state of a battery, comprising:
a memory for storing a computer program, and
a processor for executing the computer program to perform:
regularly collecting a voltage of a battery after the end of charging at a preset time interval after the battery is in an idle state, and associatively storing the collected voltage and a collection time as voltage data;
constructing a time-differential voltage curve in a voltage-time coordinate system according to the voltage data;
detecting whether a characteristic peak voltage exists in the time-differential voltage curve; and
sending a warning message when detecting that the characteristic peak voltage exists in the time-differential voltage curve,
wherein the processor further performs:
acquiring a corresponding stable voltage when the time-differential voltage curve reaches a preset stability standard;
determining a first region area and a second region area in the voltage-time coordinate system according to the characteristic peak voltage, the stable voltage, and the time-differential voltage curve; and
determining a lithium plating representation amount of the battery according to the first region area and the second region area.

6. The computer device according to claim 5, wherein the determining a first region area and a second region area in the voltage-time coordinate system according to the characteristic peak voltage, the stable voltage, and the time-differential voltage curve comprises:
determining a horizontal reference axis, a first vertical reference axis, and a second vertical reference axis in the voltage-time coordinate system, wherein the horizontal reference axis is a horizontal axis corresponding to a start point of the time-differential voltage curve, the first vertical reference axis is a vertical axis corresponding to the characteristic peak voltage, and the second vertical reference axis is a vertical axis corresponding to the stable voltage;
calculating the first region area corresponding to a region defined by the horizontal reference axis, the first vertical reference axis, and the time-differential voltage curve; and
calculating the second region area corresponding to a region defined by the horizontal reference axis, the first vertical reference axis, the second vertical reference axis, and the time-differential voltage curve.

7. The computer device according to claim 5, wherein the determining a lithium plating representation amount of the battery according to the first region area and the second region area comprises:
recording the first region area as a lithium plating duration of the battery; recording a reciprocal of the second region area as a lithium plating rate; and
recording a product of the lithium plating duration and the lithium plating rate as the lithium plating representation amount of the battery.

8. The computer device according to claim 5, wherein after the determining a lithium plating representation amount of the battery according to the first region area and the second region area, the processor further performs:
acquiring a preset lithium plating standard of the battery; and
reducing a charging current of the battery by using a preset current reduction strategy when the lithium plating representation amount is greater than the preset lithium plating standard.

9. A vehicle, comprising the computer device according to claim 5.

10. A non-transitory computer-readable storage medium storing computer-executable instructions for, when executed by one or more processors, performing method for detecting a lithium plating state of a battery, the method comprising:
  regularly collecting a voltage of a battery after the end of charging at a preset time interval after the battery is in an idle state, and associatively storing the collected voltage and a collection time as voltage data;
  constructing a time-differential voltage curve in a voltage-time coordinate system according to the voltage data;
  detecting whether a characteristic peak voltage exists in the time-differential voltage curve; and
  sending a warning message when detecting that the characteristic peak voltage exists in the time-differential voltage curve,
  wherein the method further comprises:
    acquiring a corresponding stable voltage when the time-differential voltage curve reaches a preset stability standard;
    determining a first region area and a second region area in the voltage-time coordinate system according to the characteristic peak voltage, the stable voltage, and the time-differential voltage curve; and
    determining a lithium plating representation amount of the battery according to the first region area and the second region area.

11. The non-transitory computer-readable storage medium according to claim 10, wherein the determining a first region area and a second region area in the voltage-time coordinate system according to the characteristic peak voltage, the stable voltage, and the time-differential voltage curve comprises:
  determining a horizontal reference axis, a first vertical reference axis, and a second vertical reference axis in the voltage-time coordinate system, wherein the horizontal reference axis is a horizontal axis corresponding to a start point of the time-differential voltage curve, the first vertical reference axis is a vertical axis corresponding to the characteristic peak voltage, and the second vertical reference axis is a vertical axis corresponding to the stable voltage;
  calculating the first region area corresponding to a region defined by the horizontal reference axis, the first vertical reference axis, and the time-differential voltage curve; and
  calculating the second region area corresponding to a region defined by the horizontal reference axis, the first vertical reference axis, the second vertical reference axis, and the time-differential voltage curve.

12. The non-transitory computer-readable storage medium according to claim 10, wherein the determining a lithium plating representation amount of the battery according to the first region area and the second region area comprises:
  recording the first region area as a lithium plating duration of the battery; recording a reciprocal of the second region area as a lithium plating rate; and
  recording a product of the lithium plating duration and the lithium plating rate as the lithium plating representation amount of the battery.

13. The computer device according to claim 10, wherein after the determining a lithium plating representation amount of the battery according to the first region area and the second region area, the method further comprises:
  acquiring a preset lithium plating standard of the battery; and
  reducing a charging current of the battery by using a preset current reduction strategy when the lithium plating representation amount is greater than the preset lithium plating standard.

* * * * *